United States Patent
Nomoto

(10) Patent No.: US 9,425,647 B2
(45) Date of Patent: Aug. 23, 2016

(54) CHARGING-CONTROL APPARATUS AND CHARGING-CONTROL METHOD

(71) Applicants: Furukawa Electric Co., Ltd., Tokyo (JP); Furukawa Automotive Systems Inc., Shiga (JP)

(72) Inventor: Shinichi Nomoto, Tokyo (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 25 days.

(21) Appl. No.: 13/957,666

(22) Filed: Aug. 2, 2013

(65) Prior Publication Data
US 2013/0314052 A1    Nov. 28, 2013

Related U.S. Application Data

(63) Continuation of application No. PCT/JP2012/051452, filed on Jan. 24, 2012.

(30) Foreign Application Priority Data

Mar. 4, 2011 (JP) .................................. 2011-047819

(51) Int. Cl.
*H02J 7/00* (2006.01)
*H02J 7/14* (2006.01)

(52) U.S. Cl.
CPC .............. *H02J 7/1446* (2013.01); *H02J 7/1492* (2013.01); *Y02T 10/92* (2013.01)

(58) Field of Classification Search
CPC ....... H02J 7/1446; H02J 7/1492; Y02T 10/92
USPC .......................................... 320/132, 137, 155
See application file for complete search history.

(56) References Cited

U.S. PATENT DOCUMENTS 7,566,828 B2 *   7/2009   Sasaki .......................... 136/243
2004/0232890 A1   11/2004  Ariga et al.
(Continued)

FOREIGN PATENT DOCUMENTS

| CN | 1433121 A | 7/2003 |
| CN | 101222150 A | 7/2008 |

(Continued)

OTHER PUBLICATIONS

Decision to Grant a Patent for JP Application 2011-047819 dated Aug. 7, 2013 and English Translation.
(Continued)

*Primary Examiner* — Nathaniel Pelton
(74) *Attorney, Agent, or Firm* — Thompson Coburn LLP

(57) ABSTRACT

A charging control apparatus controls a state of charge of a secondary battery installed in a vehicle by a regulator possessed by an alternator. The charging control apparatus includes a calculating unit that calculates an SOC indicating a state of charge of the secondary battery, a determining unit that performs determination of whether the SOC calculated in the calculating unit is greater than a predetermined threshold, and a controlling unit that controls the regulator in such a manner that, in a case where it is determined by the determining unit that the SOC is greater than the predetermined threshold, a power generation voltage of the alternator comes to a low state, and in a case where it is determined that the SOC is less than the predetermined threshold, a power generation voltage of the alternator comes to a high state.

6 Claims, 8 Drawing Sheets

(56) References Cited

U.S. PATENT DOCUMENTS

| | | | |
|---|---|---|---|
| 2008/0093851 A1* | 4/2008 | Maeda et al. | 290/40 A |
| 2009/0184578 A1* | 7/2009 | Owens | 307/10.7 |
| 2009/0184693 A1* | 7/2009 | Owens et al. | 322/37 |
| 2010/0001866 A1 | 1/2010 | Ichikawa et al. | |
| 2010/0019727 A1* | 1/2010 | Karden et al. | 320/129 |
| 2010/0301810 A1* | 12/2010 | Biondo et al. | 320/155 |

FOREIGN PATENT DOCUMENTS

| | | |
|---|---|---|
| CN | 101528499 A | 9/2009 |
| JP | S62-37025 A | 2/1987 |
| JP | 2001-016800 A | 1/2001 |
| JP | 2005-080396 A | 3/2005 |
| JP | 2006-067691 A | 3/2006 |
| JP | 2008-109740 A | 5/2008 |
| JP | 2010-041773 A | 2/2010 |
| WO | 2009094367 A1 | 7/2009 |

OTHER PUBLICATIONS

Office Action for JP Application 2011-047819 dated May 1, 2013 and English Translation.
International Search Report for PCT/JP2012/051452 dated May 1, 2012 and English Translation.
Extended European Search Report for Application No. 12755261.0, issued on Jul. 15, 2014.
Office Action dated Mar. 11, 2015 for corresponding Chinese Patent Application No. 201280003914.2.
Notification for Granting an Invention Patent in a corresponding Chinese application No. 201280003914.2 issued on Jul. 6, 2015 and its English translation.

* cited by examiner

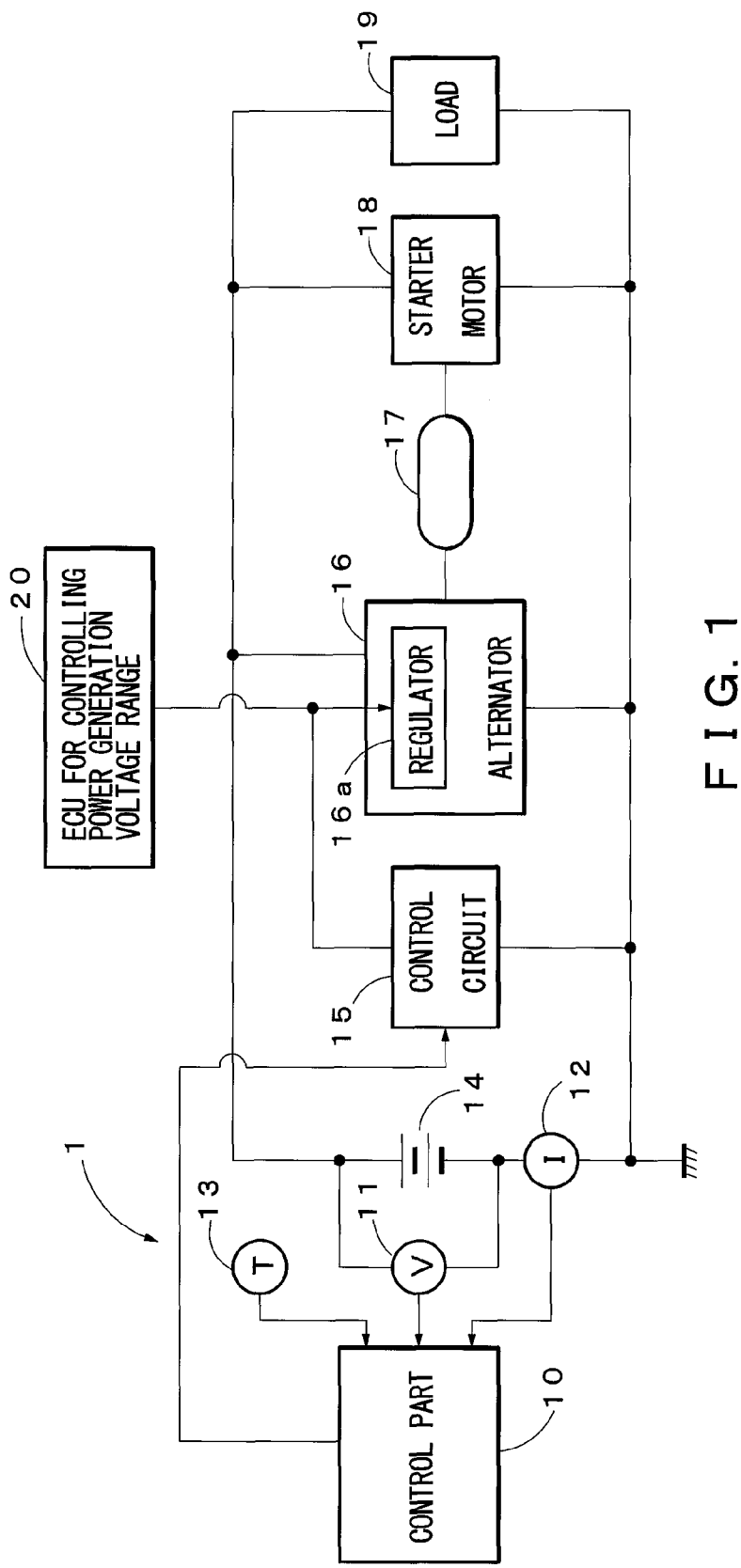
F I G. 1

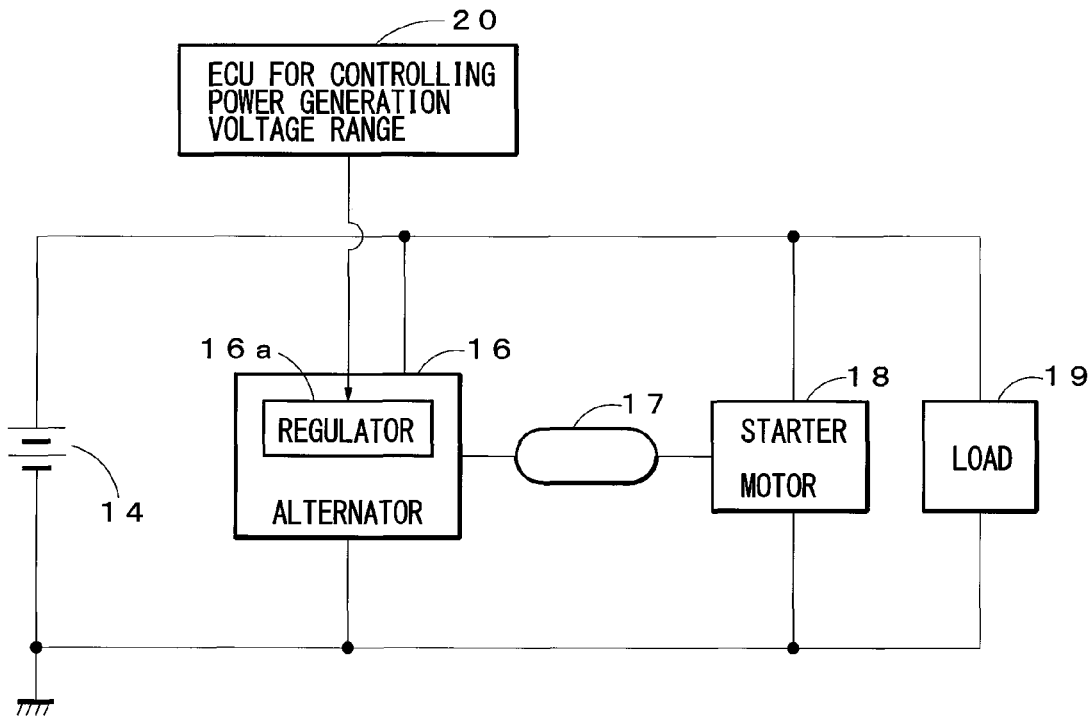
F I G. 2
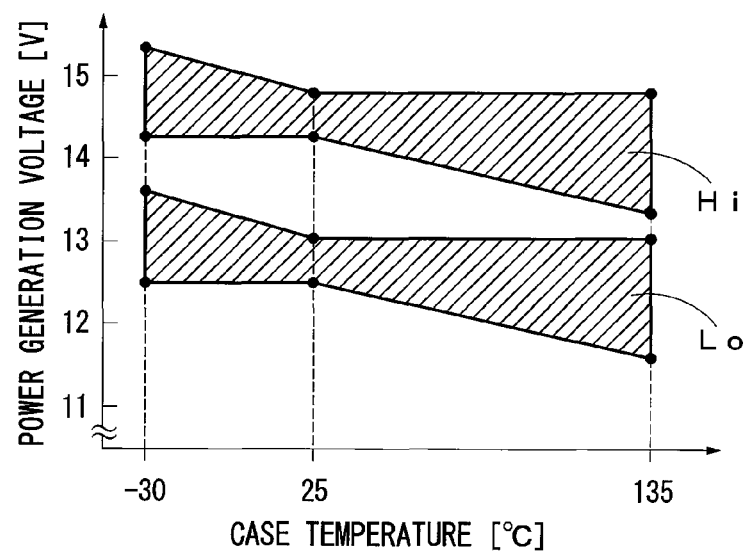
F I G. 3

| CONTROL SIGNAL FROM ECU FOR CONTROLLING POWER GENERATION VOLTAGE RANGE | CONTROL SIGNAL FROM CHARGING-CONTROL APPARATUS | CONTROL SIGNAL AFTER COMPOSITION |
|---|---|---|
| HIGH | LOW | LOW |
| HIGH | HIGH | HIGH |
| LOW | LOW | LOW |
| LOW | HIGH | LOW |
F I G. 4
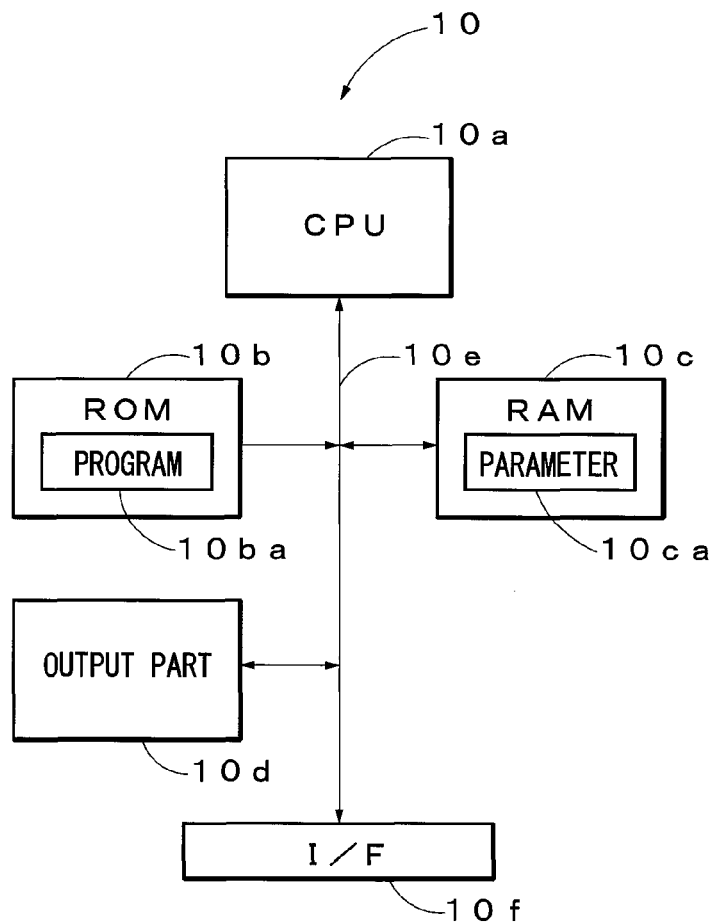
F I G. 5

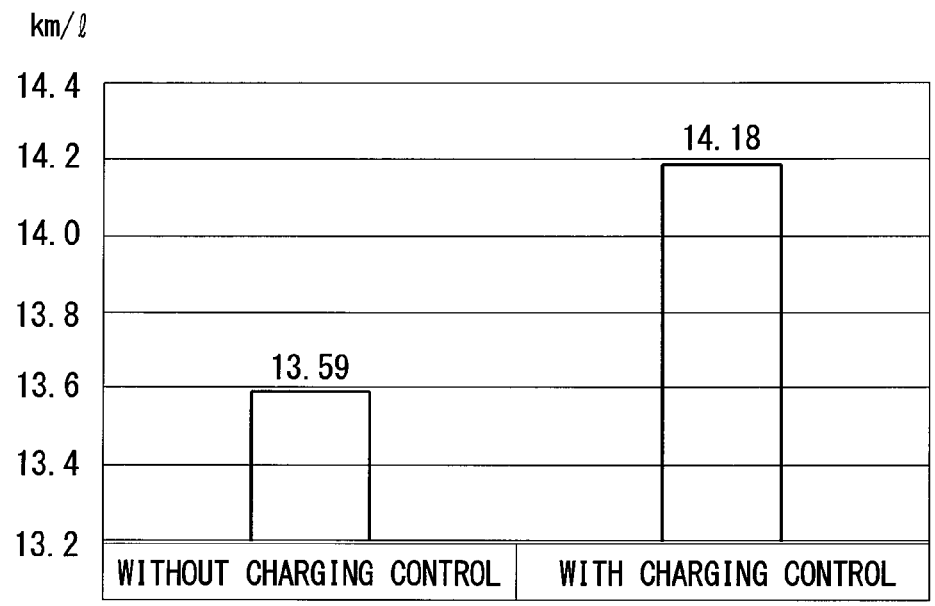
F I G. 1 0
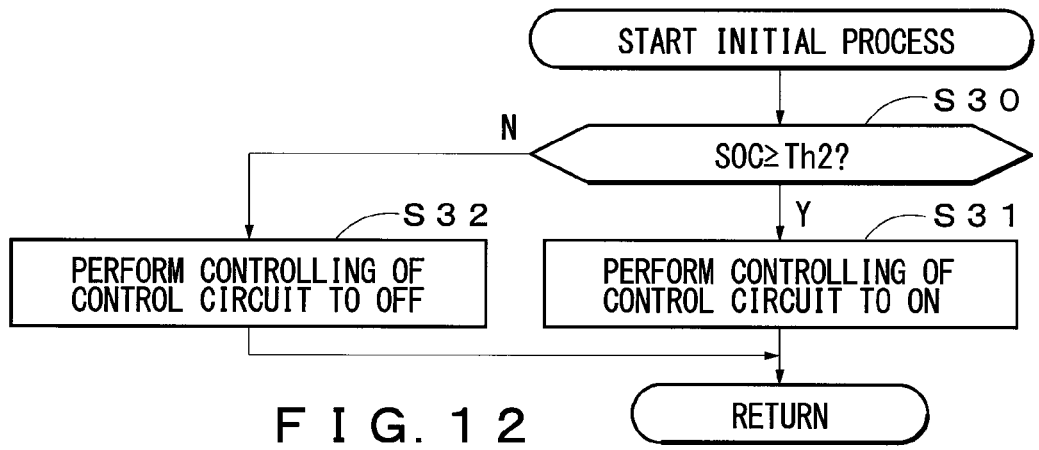
F I G. 1 2
| THRESHOLD (%) | AVERAGE FUEL CONSUMPTION RATE (km/ℓ) |
|---|---|
| Th1=80, Th2=90 | 10.64 |
| Th1=78, Th2=82 | 11.78 |
| Th1=79, Th2=81 | 14.93 |
F I G. 1 3

CHARGING-CONTROL APPARATUS AND CHARGING-CONTROL METHOD

CROSS REFERENCE TO RELATED APPLICATIONS

This is a continuation application of International Patent Application No. PCT/JP2012/051452 filed Jan. 24, 2012, which claims the benefit of Japanese Patent Application No. 2011-047819 filed Mar. 4, 2011, the full content of which is hereby incorporated by reference in their entirety.

BACKGROUND

1. Technical Field

The present disclosure relates to a charging-control apparatus and a charging-control method.

2. Background Art

In vehicles such as a car, an alternator (generator) is rotated by an output of an engine to generate electric power. The generated electric power charges a secondary battery and drives various loads (e.g., an electric steering).

Charging control which is performed when charging a secondary battery with an alternator is realized by controlling a power generation voltage of the alternator by a regulator in such a manner that a voltage of the secondary battery comes to a preset voltage. In a common charging control apparatus, in order to perform the charging of the secondary battery efficiently, the preset voltage is set to be higher than a rated voltage (e.g., 12V). I.e., the preset voltage is set to be around 13.5-14.5V. However, with such a control, in a state where the vehicle is running at a high speed and an electric load is low, it comes to an over-charged state which causes an increase in the burden on the engine, a decrease in fuel consumption rate, and an increase in a lowering of a fluid level of the secondary battery.

Thus, according to the technique described in Japanese Laid-Open Patent Publication No. S62-37025, a voltage of a secondary battery is detected, and when the voltage drops to a value below a predetermined value, it is determined to be in an over-discharged state and the preset voltage is raised to increase a charge acceptance capability, and when the detected voltage of the secondary battery is higher than the predetermined value, it is determined to be in an over-charged state and the preset voltage is lowered to suppress the charge acceptance capability.

A voltage of the secondary battery may be, for example, due to influences of polarization and stratification, outputted as a voltage higher than a voltage corresponding to an actual charging rate. Accordingly, since the voltage is high even though the charging is actually insufficient, when the preset voltage is set to be low, and there is a possibility that the capacity becomes insufficient. Also, while the vehicle is running at a high-speed, even if the voltage of the secondary battery is kept high on average, there is a possibility that the capacity becomes insufficient depending on the state of the load.

Thus, it is an object of the present disclosure to provide a charging control apparatus and a charging control method that are capable of efficiently performing charging control of a secondary battery.

SUMMARY

In order to achieve the above object, according to an aspect of the present disclosure, a charging control apparatus that controls a state of charge of a secondary battery installed in a vehicle by a regulator possessed by an alternator includes a calculating unit that calculates an SOC indicating a state of charge of the secondary battery, a determining unit that performs determination of whether the SOC calculated in the calculating unit is greater than a predetermined threshold, and a controlling unit that controls the regulator in such a manner that, in a case where it is determined by the determining unit that the SOC is greater than the predetermined threshold, a power generation voltage of the alternator comes to a low state, and in a case where it is determined that the SOC is less than the predetermined threshold, a power generation voltage of the alternator comes to a high state.

With such a configuration, the charging control of the secondary battery can be performed efficiently.

Further, in addition to the aforementioned disclosure, the threshold has hysteresis, and the determining unit performs the determination based on a first threshold in a case where the SOC is decreasing and performs the determination based on a second threshold which has a value greater than that of the first threshold in a case where the SOC is increasing.

With such a configuration, the charging control can be performed even more efficiently.

Further, in addition to the aforementioned disclosure, until a certain time has elapsed since a start-up of the engine, the determining unit performs the determination based on a comparison using the second threshold only, and after a certain time has elapsed, performs the determination based on a comparison using the first threshold and the second threshold.

With such a configuration, after having performed the charging rapidly in such a manner that the SOC becomes greater than or equal to a certain value after the engine start, it is possible to change to an effective charging control.

Further, in addition to the aforementioned disclosure, the vehicle has a control device that is provided in advance and controls the regulator in response to a power generation voltage of the alternator, the charging control apparatus is later installed in the vehicle, and the controlling unit controls the regulator in such a manner that, even in a case where the controlling device is controlling a power generation voltage of the alternator to become a high state, a power generation voltage of the alternator to come to a low state when the SOC is greater than a predetermined threshold.

With such a configuration, even with a vehicle in which the control unit is installed in advance, an effective charging control can be implemented by adding a charging control apparatus.

Further, in addition to the aforementioned disclosure, the controlling device sets a control signal that controls the regulator to a high state in a case where the power generation voltage is controlled to come to a high state, and sets a control signal that controls the regulator to a low state in a case where the power generation voltage is controlled to come to a low state, and the control unit sets a control signal that controls the regulator to a low state in such a manner that a power generation voltage of the alternator comes to a low state in a case where the SOC is greater than a predetermined threshold, and sets a control signal that controls the regulator to a high state in such a manner that a power generation voltage of the alternator comes to a high state in a case where the SOC is less than a predetermined threshold.

With such a configuration, the charging control apparatus can be easily added by adding a switch to a signal line of the control unit through which a control signal flows.

Further, a charging control method that controls a state of charge of a secondary battery installed in a vehicle by a regulator possessed by an alternator, the charging control method includes calculating an SOC indicating a state of charge of the secondary battery, performing determination of whether the SOC calculated in the calculating unit is greater than a predetermined threshold, and controlling the regulator in such a manner that, in a case where it is determined by the determining unit that the SOC is greater than the predetermined threshold, a power generation voltage of the alternator comes to a low state and, in a case where it is determined that the SOC is less than the predetermined threshold, a power generation voltage of the alternator comes to a high state.

With such a method, the charging control of the secondary battery can be performed efficiently.

According to the present disclosure, a charging control apparatus and a charge control method that can perform a charging control efficiently can be provided.

BRIEF DESCRIPTION OF DRAWINGS

FIG. 1 is a diagram showing an exemplary configuration of a charging control apparatus of an embodiment of the present disclosure.

FIG. 2 is a block diagram showing a power supply system prior to installing a charging control apparatus of an embodiment of the present disclosure.

FIG. 3 is a diagram showing a range of a power generation voltage of an alternator.

FIG. 4 is a diagram showing a relationship between control signals of an ECU for controlling power generation voltage range and a charging control apparatus, and a composite signal of these control signals.

FIG. 5 is a block diagram showing an exemplary configuration of the control part shown in FIG. 1.

FIG. 10 shows measurement results of fuel consumption rate using a vehicle for a case where the charging control apparatus is installed and a case where the charging control apparatus is not installed.

FIG. 12 is a flow chart for explaining details of step S13 of FIG. 11.

FIG. 13 shows measurement results of fuel consumption rate using a vehicle for a case where the first and second thresholds are changed.

DETAILED DESCRIPTION

Figures 6, 7:
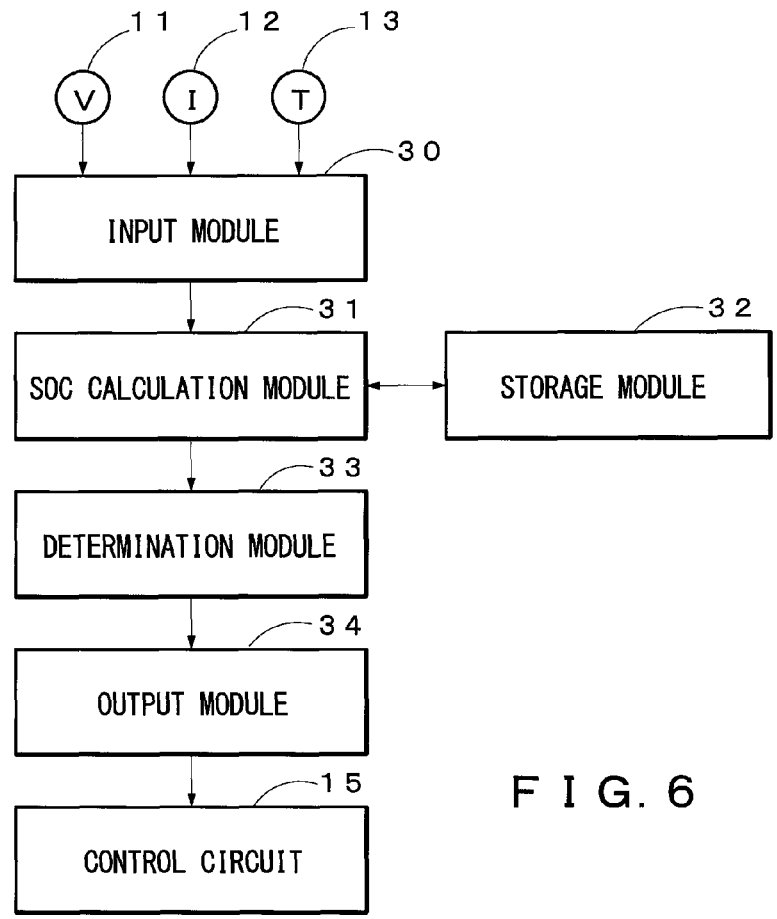
FIG. 6 is a diagram showing an example of a processing module which is implemented when the program shown in FIG. 5 is executed.
FIG. 7 is a diagram showing a relationship between a threshold and a power generation voltage.

Hereinafter, embodiments of the present disclosure will be described.

(A) Description of Configuration of an Embodiment

FIG. 1 is a diagram showing a power supply system of a vehicle having a charging control apparatus of an embodiment of the present disclosure. The charging control apparatus 1 of the present embodiment has, as its constituent elements, a control part 10, a voltage sensor 11, a current sensor 12, a temperature sensor 13 and a control circuit 15. Such a charging control apparatus 1 is later attached to the vehicle. In other words, the charging control apparatus 1 is added later to an existing power supply system shown in FIG. 2. Note that, hereinafter, first, the existing power supply system will be described with reference to FIG. 2, and then the present embodiment will be described with reference to FIG. 1. In the example of FIG. 2, the power supply system has a lead-acid battery 14, an alternator 16, a starter motor 18, a load 19 and an ECU (Engine Control Unit) for controlling power generation voltage range 20.

The lead-acid battery 14 is, for example, a so-called flooded lead-acid battery in which lead dioxide is used as a positive electrode (cathode plate), sponge-like lead is used as a negative electrode (anode plate) and dilute sulfuric acid is used as an electrolyte. The lead-acid battery 14 is charged by an alternator 16, starts up an engine by driving a starter motor 18, and supplies electric power to a load 19. The alternator 16 is driven by an engine 17, generates an alternating current electric power, converts the alternating current electric power into a direct current power with a rectifying circuit, adjusts a voltage by a regulator 16a and charges the lead-acid battery 14.

The ECU for controlling power generation voltage range 20 adjusts a charged state of the lead-acid battery 14 by adjusting a power generation voltage of the alternator 16 by controlling the regulator 16a in response to, for example, the voltage of the lead-acid battery 14 or a running condition of the vehicle. The regulator 16a controls the power generation voltage of the alternator 16 in response to a control signal supplied from the ECU for controlling power generation voltage range 20 by controlling an electric current to be supplied to a magnetizing coil, not shown, of the alternator 16. Note that, in the present embodiment, the voltage of electricity generated by the alternator 16 is within a high voltage range when the control signal outputted by the ECU for controlling power generation voltage range 20 is high (Hi), and within a low voltage range when the control signal outputted by the ECU for controlling power generation voltage range 20 is low (Lo). FIG. 3 is a diagram showing a relationship between an ambient temperature (e.g., case temperature) of the regulator 16a and a power generation voltage. Here, an upper hatched region shows a change in the power generation voltage by temperature in a case where the control signal is high. A lower hatched region shows a change in the power generation voltage by temperature in a case where the control signal is low. In this manner, as for the power generation voltage of alternator 16, the range of voltage is different depending on whether the control signal supplied from the ECU for controlling power generation voltage range 20 to the regulator 16a is high or low.

The engine 17 is constituted by, for example, a reciprocating engine such as a gasoline engine and a diesel engine or a rotary engine, and is started up by the starter motor 18, applies a propulsion force to the vehicle by driving a propulsion driving wheel via a transmission, and generates electric power by driving the alternator 16. The starter motor 18 is, for example, a direct current electric motor, generates a rotational force by the electric power supplied from the lead-acid battery 14, and starts up the engine 17. The load 19 may be, for example, an electric steering motor, a defogger, an ignition coil, a car audio system, a car navigation system and the like, and operates by an electric power from the lead-acid battery 14.

Hereinafter, FIG. 1 will be described. The charging control apparatus 1 of the present embodiment is equipped with the charging control apparatus 1 shown in FIG. 1 in addition to an existing power supply system shown in FIG. 2. The charging control apparatus 1 shown in FIG. 1 includes, as its main constituent elements, the control part 10, the voltage sensor 11, the current sensor 12, the temperature sensor 13 and the control circuit 15. The charging control apparatus 1 shown in FIG. 1 calculates SOC (State of Charge) of the lead-acid battery 14 and controls the regulator 16a together with the ECU for controlling power generation voltage range 20 based on the calculated SOC.

The voltage sensor 11 detects a terminal voltage of the lead-acid battery 14 and informs the control part 10 of the terminal voltage. The current sensor 12 detects a current flowing to the lead-acid battery 14 and informs the control part 10 of the current. The temperature sensor 13 detects a temperature of the lead-acid battery 14 itself or an environmental temperature of surroundings, and informs the control part 10. The control circuit 15 is, for example, a semiconductor switch which comes to an on or an off state based on a control signal from the control part 10. The control circuit 15 has two output terminals connected to a control signal line of the ECU for controlling power generation voltage range 20 and a ground, and an input terminal is connected to the control part 10. When the control signal is high, it comes to a high impedance (off) state and when the control signal is low, it comes to a low impedance (on) state.

FIG. 4 is a diagram showing a control signal outputted from the ECU for controlling power generation voltage range 20, a control signal outputted from the charging control apparatus 1, and a composite control signal (a control signal inputted into the regulator 16a) obtained by composition of the two control signals. As shown in FIG. 4, the composite control signal that is inputted into the regulator 16a is obtained by a logical AND operation between a control signal outputted from the ECU for controlling power generation voltage range 20 and the control signal outputted from the charging control apparatus 1. In other words, when the control signal outputted from ECU for controlling power generation voltage range 20 and the control signal outputted from the charging control apparatus 1 are both high, the control signal inputted into the regulator 16a is in a high state, and for other cases, it is in a low state. As a result, the power generation voltage of the alternator 16 will be in a high voltage range shown in FIG. 3 when the control signal outputted from ECU for controlling power generation voltage range 20 and the control signal outputted from the charging control apparatus 1 are both high, and it is in a low voltage range when they are not both high.

FIG. 5 is a diagram showing a detailed exemplary configuration of the control part 10 shown in FIG. 2. As shown in FIG. 5, the control part 10 has a CPU (Central Processing Unit) 10a, a ROM (Read Only Memory) 10b, a RAM (Random Access Memory) 10c, an output part 10d, a bus 10e and an I/F (Interface) 10f. The CPU 10a controls each part based on a program 10ba stored in the ROM 10b. The ROM 10b may be a semiconductor memory or the like and stores the program 10ba, etc. The RAM 10c may be a semiconductor memory or the like and stores a parameter 10ca which is generated when the program 10ba is executed. The output part 10d supplies a control signal to the control circuit 15. The bus 10e is a signal line group for enabling data to be sent and received mutually between the CPU 10a, the ROM 10b, the RAM 10c, the output part 10d and the I/F 10f. The I/F 10f converts signals supplied from the voltage sensor 11, the current sensor 12 and the temperature sensor 13 into digital signals and takes them in.

FIG. 6 is a diagram showing process modules which are realized by a cooperation between hardware resources such as the CPU 10a and software resources such as the program 10ba, when the program 10ba shown in FIG. 5 is executed. In the present embodiment, the processing module has, as its main constituent elements, an input module 30, a SOC calculation module 31, a storage module 32 and output module 34. Here, the input module 30 receives signals outputted from the voltage sensor 11, the current sensor 12 and the temperature sensor 13, and supplies them to the SOC calculation module 31. The SOC calculation module 31 performs calculation of a SOC of the lead-acid battery 14 based on voltage, current and temperature supplied from the input module 30, and supplies the obtained SOC to a determination module 33. Note that, as a method of performing calculation of the SOC, for example, an equivalent circuit model of the lead-acid battery 14 may be created, and, for example, adaptive learning of parameters of the equivalent circuit model may be performed using a Kalman filter, and, the SOC may be calculated based on obtained parameters. Of course, the SOC may be calculated by a method other than the method described above. The storage module 32 stores parameters, an equivalent circuit model, or the like, which are necessary for the SOC calculation module 31 to calculate the SOC. The determination module 33 compares SOC with the threshold and outputs a comparison result to the output module 34. The output module 34 controls the control circuit 15 to an on or off state based on an output from the determination module 33.

(B) Description of an Overview of an Operation of the Embodiment

Hereinafter, an outline of an operation of the present embodiment will be described. FIG. 7 is a diagram showing a relationship between the state of the control circuit and the power generation voltage. In the described embodiment, as shown in FIG. 7, a process is different between an initial state which is immediately after the start-up of engine 17 and a normal state other than the initial state. Accordingly, in the following description, an operation of the initial state will be described first and an operation of the normal state will be described next.

In the initial state which is immediately after the start-up of the engine 17, the charging control apparatus 1 performs an initial process. In the initial process, as shown in a left hand-side column labeled "state of control circuit" in FIG. 7, when the SOC is greater than or equal to the second threshold Th2, the control circuit 15 is controlled to an ON state, and, as shown in a left hand-side column of "power generation voltage" in FIG. 7, the power generation voltage of the alternator 16 becomes a low state (a state "Lo" in FIG. 3). On the other hand, when the SOC is less than the second threshold Th2, the control circuit 15 is controlled to an OFF state, and the power generation voltage of the alternator 16 becomes a high state (a "Hi" state in FIG. 3). In other words, in the initial state which is immediately after the start-up of the engine 17, the control is performed in such a manner that, when the SOC of the lead-acid battery 14 is less than the second threshold Th2, the power generation voltage is brought to the "Hi" state and the charging is performed rapidly, and when the SOC is greater than or equal to the second threshold Th2, the power generation voltage is brought to a "Lo" state and the charging is performed moderately.

When a certain time has elapsed since the start-up of the engine 17, the process proceeds to a normal process. In the normal process, a charging control is performed based on a threshold having a hysteresis. Specifically, as shown in a leftmost column in FIG. 7, the charging control is performed based on two thresholds, i.e., a first threshold Th1 and a second threshold Th2. In the normal process, as shown in a right-hand side column labeled "state of control circuit" in FIG. 7, in an increasing phase of the SOC, when the SOC is less than the second threshold Th2, the control circuit 15 is controlled to an OFF state, and, the power generation voltage of the alternator 16 comes to a high state ("Hi" state in FIG. 3) as shown in a right-hand side column labeled "power generation voltage" in FIG. 7. Similarly, in an increasing-phase of the SOC, when the SOC becomes greater than or equal to the second threshold Th2, the control circuit 15 is controlled to an ON state, and, as shown in the right hand side column labeled "power generation voltage" in FIG. 7, the power generation voltage of the alternator 16 becomes the low state ("Lo" state in FIG. 3). On the other hand, in a decreasing phase of the SOC, when the SOC is greater than the first threshold Th1, the control circuit 15 is controlled to the ON state, and the power generation voltage of the alternator 16 comes to a low state ("Lo" state in FIG. 3). Similarly, in a decreasing phase of the SOC, when the SOC is less than or equal to the first threshold Th1, the control circuit 15 is controlled to the OFF state, and the power generation voltage of the alternator 16 comes to a high state ("Hi" state in FIG. 3).

According to the control described above, in the initial process immediately after the start-up of the engine 17, the control is performed in such a manner that the SOC becomes greater than or equal to the second threshold, and when the process proceeds to the normal process, the power generation voltage of the alternator 16 is controlled based on the first threshold and second threshold. Without the charging control apparatus 1 of the present embodiment being equipped, high and low states of the power generation voltage is controlled by the ECU for controlling power generation voltage range 20 based on the voltage of the lead-acid battery 14. With the charging control apparatus 1 being equipped, as shown in FIG. 4, even if a control signal of the ECU for controlling power generation voltage range 20 is in a state of high, when a control signal of the charging control apparatus 1 is low, the composite control signal comes to a low state and the power generation voltage will also be in a low state. Thereby, since the power generation voltage comes to a low state more frequently, a rotational load of the alternator 16 is decreased, and, as a result, a load on the engine 17 is reduced, and fuel consumption rate improves. Since the charging control apparatus 1 performs the control based on the SOC of the lead-acid battery 14 and performs the control in such a manner that the SOC is within a predetermined range, the charging state of the lead-acid battery 14 can be prevented from decreasing and the shortening of the life of the lead-acid battery 14 by a decrease in the charged state can be prevented. Further, by providing a hysteresis, since a so-called "chattering" in which the state is frequently switched over between high and low is prevented, the regulator 16a and the alternator 16 can be prevented from experiencing an excessive load.

Figure 8:
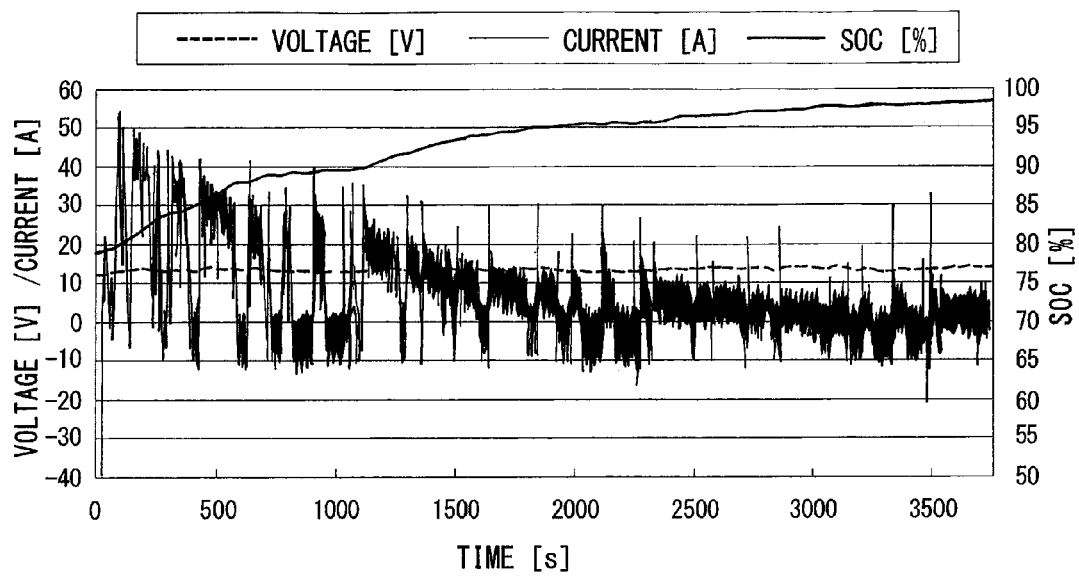
FIG. 8 is a diagram showing a temporal change in an SOC, a voltage, and an electric current of a lead-acid battery for a case where the charging control apparatus is not installed.
Figure 9:
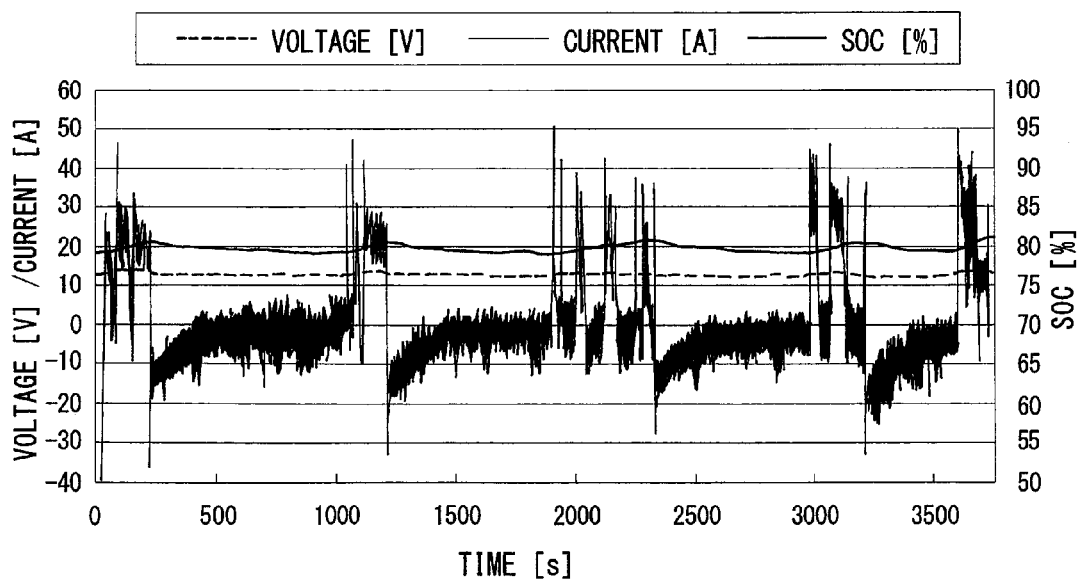
FIG. 9 is a diagram showing a temporal change in an SOC, a voltage, and an electric current of a lead-acid battery for a case where the charging control apparatus is installed.

FIG. 8 is a diagram showing a temporal change in the voltage, the current and the SOC of the lead-acid battery 14 (a case of FIG. 2) when the charging control apparatus 1 is not installed, and FIG. 9 is a diagram showing a temporal change in the voltage, the current and the SOC of the lead-acid battery 14 (in a case of FIG. 1) when the charging control apparatus 1 is installed. Note that, in FIGS. 8 and 9, a positive current indicates the charging of the lead-acid battery 14, and a negative current indicates the discharging thereof. Also, Th1 and Th2 shown in FIG. 7 are set at 79% and 81%, respectively. As shown in FIG. 8, when the charging control apparatus 1 is not installed, the control is performed in such a manner that the SOC approaches 100%. On the other hand, as shown in FIG. 9, when it is equipped with the charging control apparatus 1, the SOC is controlled to be within a range of 79% and 81% which set by Th1 and Th2. Regarding the voltage, FIG. 8 shows that the voltage gradually increases with an increase in the SOC, and FIG. 9 shows that the voltage is generally constant. Further, regarding the current, FIG. 8 shows that the current is frequently located on the positive side (the charging side). On the other hand, FIG. 9 shows that the current is frequently located on the negative side (the discharging side). More particularly, a cycle is repeated in which, once the charging is performed and the SOC has increased, a negative state continues, and as the SOC decreases, the charging is performed again and the SOC increases. From the comparison of these diagram, it can be considered that, with the charging control apparatus 1 being installed, the frequency of the charging decreases (the frequency that the power generation voltage of the alternator 16 comes to a high range becomes low).

FIG. 10 is a diagram showing actual measured values of fuel consumption rate for a case where the charging control apparatus 1 is installed in a vehicle and a case where the charging control apparatus 1 is not installed in a vehicle. This example is a result of a fuel consumption rate test carried out by a chassis dynamometer using a vehicle having an engine capacity of 1300 cc, FF (Front Engine Front Drive) and 4AT (Automatic Transmission). As shown in FIG. 10, when the charging control apparatus 1 is not installed (in the case of FIG. 2), an average fuel consumption rate of three observations was 13.59 km/l, and when the charging control apparatus 1 in installed (in the case of FIG. 1), an average fuel consumption rate of three observations was 14.18 km/l, resulting in an improvement in the fuel consumption rate of 4.3%.

Thus, in the present embodiment, the fuel consumption rate can be improved since the level of the power generation voltage by the alternator 16 is controlled based on a comparison between the SOC and the threshold.

Also, by performing a control based on the hysteresis by providing two thresholds, an occurrence of the chattering can be prevented.

Further, the charging control apparatus 1 can be easily added by inserting the control circuit 15 between an existing control signal line and the ground. Therefore, the installing of the charging control apparatus 1 in an existing vehicle can be performed easily.

(C) Description of Details of Operation of the Present Embodiment

Figure 11:
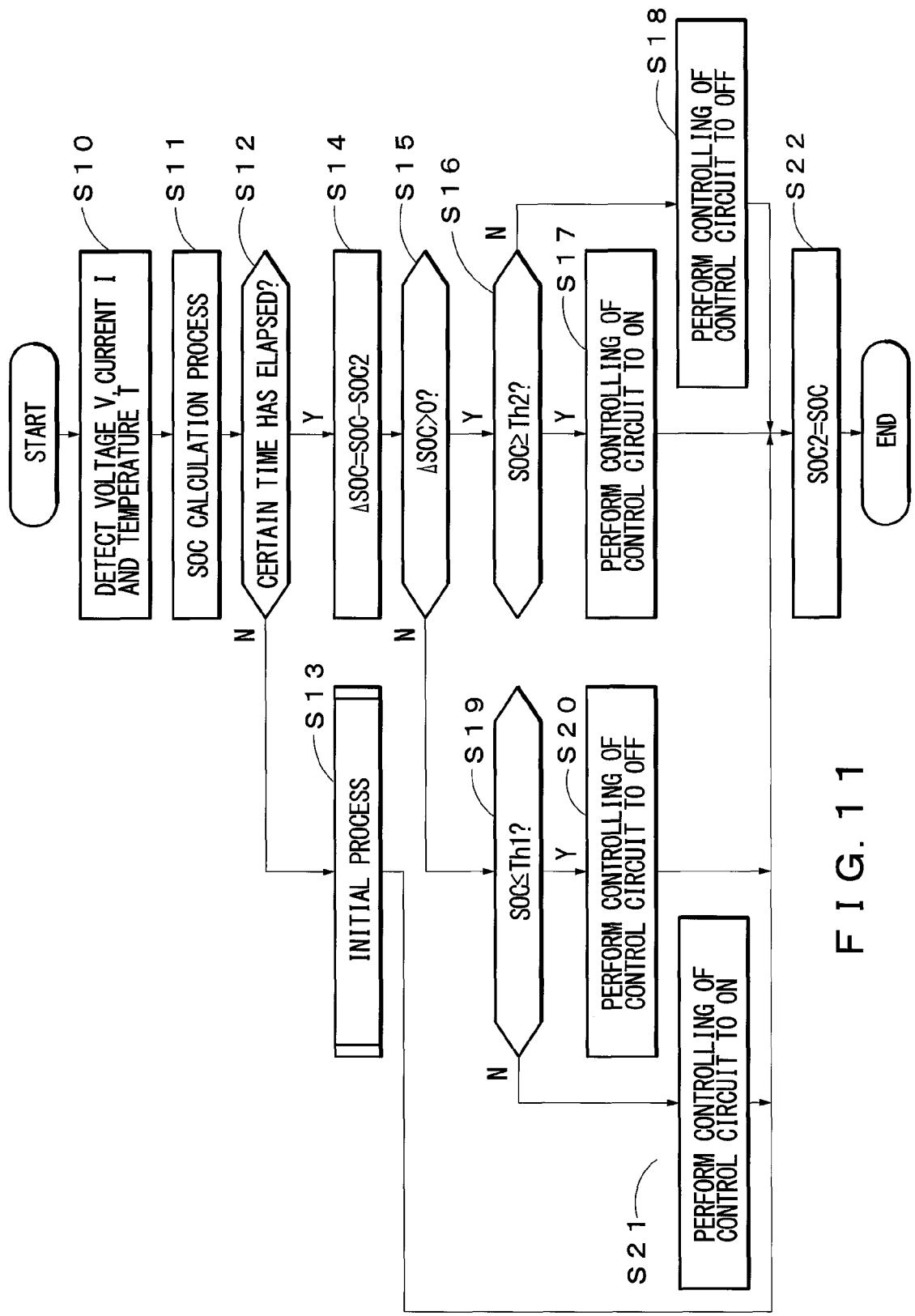
FIG. 11 is a flow chart for explaining operation of the present embodiment.

Hereinafter, details of the operation of the embodiment will be described. FIG. 11 is a flow chart for explaining the flow of a process performed by the modules shown in FIG. 6. When a process shown in FIG. 11 is started, the following steps are performed.

In step S10, the input module 30 receives voltage V, current I and temperature T from the voltage sensor 11, the current sensor 12 and the temperature sensor 13, respectively.

In step S11, a SOC calculation module 31 performs a process of calculating the SOC of the lead-acid battery 14 based on the voltage V, the current I and the temperature T inputted in step S10, and data stored in the storage module 32. Note that, this process may be realized by, for example, applying an adaptive learning using a Kalman filter to, for example, an equivalent circuit model of the lead-acid battery 14, and calculating the SOC based on the obtained value (e.g., OCV (Open Circuit Voltage: open circuit voltage)). Of course, the method is not limited thereto.

In step S12, the determination module 33 determined whether a certain time has elapsed since the start-up of the engine 17, and when a certain time has elapsed (step S12: Yes), the process proceeds to step S14, and when a certain time has not elapsed (step S12: No), the process proceeds to step S13. More specifically, in this process, it is determined whether it is the "initial state" described above based on FIG.

7, and when it is the initial state (when a certain time has not elapsed since the start-up), the initial process of step S13 is performed.

In step S13, the determination module 33 performs an initial process. Note that the detail of this process will be described below with reference to FIG. 12.

In step S14, the determination module 33 subtracts SOC2, which is a SOC obtained in the latest process, from SOC obtained in step S11, and substitutes the obtained value into ΔSOC. Note that when a value of the present SOC is greater than the value of the previous SOC (in an increasing phase), the value of ΔSOC becomes a positive value, and when the value is less than the value of the previous SOC (in a decreasing phase), the value of ΔSOC becomes a negative value.

In step S15, the determination module 33 performs a determination of whether ΔSOC obtained in step S14 satisfies ΔSOC>0, and when it satisfies (step S15: Yes), the process proceeds to step S16, and when it does not satisfy (step S15: No), the process proceeds to step S19. Specifically, when the value of the present SOC is greater than the value of the previous SOC (in an increasing phase), the process proceeds to step S16, and when it is not, the process proceeds to step S19.

In step S16, the determination module 33 performs a determination of whether the value of SOC, which was obtained in step S11 satisfies SOC≥Th2, and when it satisfies (step S16: Yes), the process proceeds to step S17, and when it does not satisfy (step S16: No), the process proceeds to step S18. Specifically, in an increasing phase of SOC, when SOC≥Th2 is satisfied, the process proceeds to step S17, and when it is not satisfied, the process proceeds to step S18.

In step S17, the determination module 33 controls the output module 34 and brings the control circuit 15 to an ON state. Thereby, since a control signal inputted into the regulator 16a is in a low state irrespective of a state of the ECU for controlling power generation voltage range 20, the power generation voltage of the alternator 16 is set in a low range.

In step S18, the determination module 33 controls the output module 34 and brings the control circuit 15 to an off state. In this case, when a control signal outputted by ECU for controlling power generation voltage range 20 is high, a control signal inputted into the regulator 16a becomes a high state and the power generation voltage of the alternator 16 is set to a high range, and, in a case of low, the control signal comes to a low state and the power generation voltage of the alternator 16 is set in a low range.

In step S19, the determination module 33 performs a determination of whether a value of SOC which is obtained in step S11 satisfies SOC≤Th1, and when satisfies (step S19: Yes), the process proceeds to step S20, and when it is not satisfied (step S19: No), the process proceeds to step S21. Specifically, in a decreasing phase of the SOC, when SOC≤Th1 is satisfied, the process proceeds to step S20, and when it is not satisfied, the process proceeds to step S21.

In step S20, the determination module 33 controls the output module 34 and brings the control circuit 15 to an off state. In this case, when a control signal outputted by the ECU for controlling power generation voltage range 20 is high, the control signal inputted into the regulator 16a comes to a high state, and the power generation voltage of the alternator 16 is set to a high range, and, when it is low, the control signal comes to a low state, and the power generation voltage of the alternator 16 is set to a low range.

In step S21, the determination module 33 controls the output module 34 and brings the control circuit 15 to an ON state. Thereby, since a control signal of the regulator 16a is in a low state irrespective of a state of the ECU for controlling power generation voltage range 20, the power generation voltage of the alternator 16 is set to a low range.

In step S22, the SOC obtained in step S11 is substituted into SOC2. Thereby, the SOC obtained in the present process is substituted into SOC2 and can be used when obtaining ΔSOC in step S14 in a next process.

Hereinafter, details of the process of step S13 in FIG. 11 will be described with reference to FIG. 12. When a process of FIG. 13 is started, the following steps are performed.

In step S30, the determination module 33 performs a determination of whether a value of SOC obtained in step S11 satisfies SOC≥Th2, and when it is satisfied (step S30: Yes), the process proceeds to step S31, and when it is not satisfied (step S30: No), the process proceeds to step S32. Specifically, in an initial state which is a certain period of time from the start-up of engine 17, when SOC≥Th2 is satisfied, the process proceeds to step S31, and it is not satisfied, the process proceeds to step S32.

In step S31, the determination module 33 controls the output module 34 and brings the control circuit 15 to an ON state. Thereby, since a control signal inputted into the regulator 16a is in a low state irrespective of a state of the ECU for controlling power generation voltage range 20, the power generation voltage of the alternator 16 is set to a low range.

In step S32, the determination module 33 controls the output module 34 and brings the control circuit 15 to an off state. In this case, when a control signal outputted from the ECU for controlling power generation voltage range 20 is high, a control signal inputted into the regulator 16a is in a high state, and the power generation voltage of the alternator 16 is set to the high range, and, in the case of low, the control signal is in a low state, and the power generation voltage of the alternator 16 is set to a low range. When the process is terminated, the process goes back (returns) to FIG. 11.

As has been described above, immediately after the start-up of the engine 17, the power generation voltage of the alternator 16 is set high by an initial process in such a manner that the SOC is greater than or equal to Th2, and the lead-acid battery 14 can be charged rapidly.

Also, in an increasing phase of the SOC of the normal process, when SOC≥Th2, the control circuit is brought to an ON state, and when SOC≥Th2 does not satisfy, the control circuit is brought to an OFF state. On the other hand, in a decreasing phase of the SOC in the normal process, when SOC≤Th1, the control circuit is brought to an OFF state, and when SOC≤Th1 does not satisfy, the control circuit is brought to an ON state. Thereby, a hysteresis control which is based on the two thresholds shown in FIG. 7 can be realized.

As has been described above, according to the present embodiment, since the level of the power generation voltage is controlled based on a relationship between the SOC and the threshold, fuel consumption rate can be improved by reducing the load of the engine 17 as indicated by the measured value.

Also, in the present embodiment, since the control signal is changed by turning on/off the control circuit 15, the charging control apparatus of the present embodiment can be easily added to a vehicle having the ECU for controlling power generation voltage range 20.

Also, in the present embodiment, the charging control apparatus 1 is configured to calculate the SOC in real time by being provided with the voltage sensor 11, the current sensor 12 and the temperature sensor 13. In the related art, in order to accurately know the SOC, it was necessary to fully charge the lead-acid battery first. However, in the present embodiment, since it is not necessary to fully charge the battery, it is possible to eliminate a waste of electric power before the full charging of the battery. Also, since the control is performed based on the SOC, it is not necessary to know the status of the vehicle, and, for example, since the control can be performed without vehicle signals such as a vehicle speed signal or an accelerator signal, the wiring work at the time of mounting can be facilitated.

(D) Description of Variant Embodiments

The aforementioned embodiment is shown by way of example, and the present disclosure is not limited to the aforementioned cases. For example, in the aforementioned embodiment, although Th1=79% and Th2=81% were used for thresholds Th1 and Th2, the values are not limited thereto. FIG. 13 shows values of fuel consumption rate measured when a vehicle was driven on a public road with the charging control apparatus 1 being installed and Th1 and Th2 being varied. As shown in FIG. 13, the fuel consumption rate improves as a difference between Th1 and Th2 becomes smaller. Specifically, the fuel consumption rate was 10.64 km/l for the case of Th1=80%, Th2=90%, 11.78 km/l for the case of Th1=78%, Th2=82%, and 14.93 km/l for the case of Th1=79%, Th2=81%. Accordingly, it is desirable to set the difference between Th1 and Th2 to be as small as possible. Of course, it is possible to set Th1=Th2, when chattering is not problematic.

In the aforementioned embodiment, Th1 and Th2 were assumed to be fixed values, but, for example, these values may be rewritable. With such a configuration, for example, these values may be appropriately made adjustable depending on a type or a purpose of use of the lead-acid battery 14. Further, a fully chargeable capacity of the lead-acid battery 14 decreases due to aging (degradation). Thus, the values of Th1 and Th2 may be changed depending on the aging. Specifically, the OCV of the lead-acid battery 14 may be measured and the values of Th1 and Th2 may be decreased depending on the value of the measured OCV. With such a structure, even if the lead-acid battery 14 has experienced an aging, the charging control can be performed appropriately.

Also, in the aforementioned embodiment, although the second threshold in the normal process was used as the threshold in the initial process, the threshold in the initial process may differ from the second threshold. For example, a rapid charging up to a certain SOC can be achieved in the initial process by using a value greater than the second threshold. Note that, by setting a threshold in the initial process to the second threshold in a similar manner to the present embodiment, a transition from the initial process to the normal process can be performed smoothly.

Figure 14:
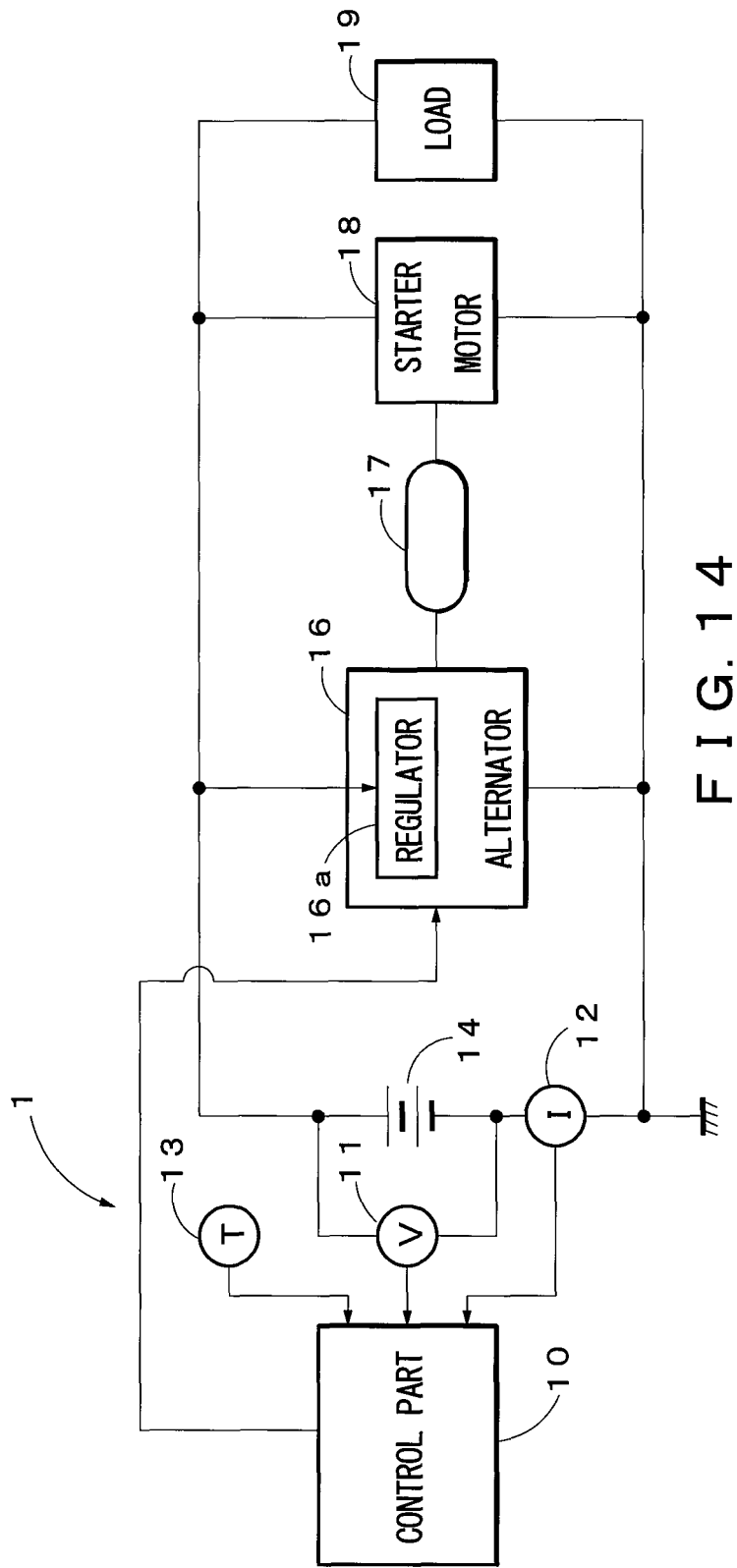
FIG. 14 is a diagram showing another exemplary configuration of the present embodiment.

Also, in the aforementioned embodiment, an example in which the charging control apparatus 1 is later installed in the vehicle equipped with the ECU for controlling power generation voltage range 20. However, instead of the ECU for controlling power generation voltage range 20, the charging control apparatus 1 may be installed from the beginning. FIG. 14 is diagram showing an exemplary configuration of the embodiment for such a case. In the example of FIG. 14, as compared to case of FIG. 1, the ECU for controlling power generation voltage range 20 and the control circuit 15 are omitted and a control signal outputted from the control part 10 is directly inputted into the regulator 16*a*. The remaining configuration is similar to that of FIG. 1. In the case of such an embodiment, among the four combinations, there are three combinations for which the power generation voltage of the alternator 16 is low. On the other hand, in a case where only the charging control apparatus 1 is provided, among the two combinations, there is a single combination for which the power generation voltage of the alternator 16 is low. Therefore, when simply comparing the combinations, the probability that the power generation voltage becomes a low state decreases from ¾ (three fourth) to ½ (half). However, as has been described with reference to FIG. 8, since the control signal from the ECU for controlling power generation voltage range 20 becomes a high state more frequently, the two combinations on an upper row in FIG. 4 are obtained for most of the times, and, as a result, the embodiment shown in FIG. 14 shows an operation similar to that of FIG. 1. Therefore, similarly to the case of FIG. 14, fuel consumption rate can be improved.

Also, rather than directly controlling the control signal by an output from control part 10, a control signal outputted from the control part 10 may be inputted into the ECU for controlling power generation voltage range 20 where a logic AND operation with the control signal of the ECU for controlling power generation voltage range 20 is performed, and then the regulator 16*a* may be controlled based on the obtained result. Alternatively, a control signal outputted from the ECU for controlling power generation voltage range 20 may be inputted into the control part 10 once where a logic AND operation with the control signal of the control part 10 is performed, and then the regulator 16*a* may be controlled based on the obtained result.

Also, the flow chart shown in FIGS. 11 and 12 are shown by way of example, and the embodiments are not limited to such processes. In other words, any process is possible as long as the control based on the threshold shown in FIG. 7 is can be performed.

Also, in the aforementioned embodiment, although the lead-acid battery 14 was taken as an example of the secondary battery, for example, a nickel cadmium battery, a nickel metal hydride battery and a lithium-ion battery may also be used.

What is claimed is:

1. A charging control apparatus that controls a state of charge of a secondary battery installed in a vehicle by a regulator possessed by an alternator, the charging control apparatus comprising:
    a processor configured to:
    calculate an SOC indicating a state of charge of the secondary battery;
    perform a determination of whether the calculated SOC is greater than a predetermined threshold; and
    control the regulator in such a manner that, in a case where it is determined that the calculated SOC is greater than the predetermined threshold, a power generation voltage of the alternator comes to a low state, and in a case where it is determined that the calculated SOC is less than the predetermined threshold, a power generation voltage of the alternator comes to a high state, wherein
    the threshold has hysteresis, and the determination is based on a first threshold in a case where the SOC is decreasing and the determination is based on a second threshold which has a value greater than that of the first threshold in a case where the SOC is increasing; and
    the processor being configured to control the regulator in such a manner that, in a case where it is determined that the SOC increases and is greater than the second threshold, a power generation voltage of the alternator comes to a low state, in a case where it is determined that the SOC decreases and is less than the first threshold, a power generation voltage of the alternator comes to a high state, and in a case where it is determined that the SOC is between the first predetermined threshold and the second predetermined threshold, the power generation voltage of the alternator is maintained.

2. The charging control apparatus according to claim 1, wherein, until a certain time has elapsed since a start-up of the engine, the processor performs the determination based on a comparison using the second threshold only, and after a certain time has elapsed, performs the determination based on a comparison using the first threshold and the second threshold.

3. The charging control apparatus according to claim 1, wherein the vehicle has a control device that is provided in advance and controls the regulator in response to a power generation voltage of the alternator,
wherein the charging control apparatus is later installed in the vehicle, and
wherein the processor is configured to control the regulator in such a manner that, even in a case where the controlling device is controlling a power generation voltage of the alternator to become a high state, a power generation voltage of the alternator to come to a low state when the calculated SOC is greater than a predetermined threshold.

4. The charging control apparatus according to claim 3, wherein the controlling device is adapted to set a control signal that controls the regulator to a high state in a case where the power generation voltage is controlled to come to a high state, and is adapted to set a control signal that controls the regulator to a low state in a case where the power generation voltage is controlled to come to a low state, and
wherein the processor is adapted to set a control signal that controls the regulator to a low state in such a manner that a power generation voltage of the alternator comes to a low state in a case where the SOC is greater than a predetermined threshold, and is adapted to set a control signal that controls the regulator to a high state in such a manner that a power generation voltage of the alternator comes to a high state in a case where the SOC is less than a predetermined threshold.

5. The charging control apparatus according to claim 1 wherein the processor comprises a plurality of processors.

6. A charging control method that controls a state of charge of a secondary battery installed in a vehicle by a regulator possessed by an alternator, the charging control method comprising:
calculating an SOC indicating a state of charge of the secondary battery;
performing a determination of whether the calculated SOC is greater than a predetermined threshold; and
controlling the regulator in such a manner that, in a case where it is determined that the SOC is greater than the predetermined threshold, a power generation voltage of the alternator comes to a low state and, in a case where it is determined that the SOC is less than the predetermined threshold, a power generation voltage of the alternator comes to a high state, wherein
the threshold has hysteresis, and the determination is performed based on a first threshold in a case where the SOC is decreasing and the determination is performed based on a second threshold which has a value greater than that of the first threshold in a case where the SOC is increasing; and
the regulator is controlled in such a manner that, in a case where it is determined that the SOC is increasing and is greater than the second threshold, a power generation voltage of the alternator comes to a low state, in a case where it is determined that the SOC is decreasing and is less than the first threshold, a power generation voltage of the alternator comes to a high state, and in a case where it is determined that the SOC is between the first predetermined threshold and the second predetermined threshold, the power generation voltage of the alternator is maintained.

* * * * *